United States Patent [19]
Malamy et al.

[11] Patent Number: 6,094,201
[45] Date of Patent: Jul. 25, 2000

[54] POLYGON RENDERING METHOD AND SYSTEM WITH DEDICATED SETUP ENGINE

[75] Inventors: Adam Malamy, Foster City; Nicholas R. Baker, Cupertino; Robert Laker; Padma Parthasarathy, both of Fremont; Adrian Sfarti, Sunnyvale, all of Calif.

[73] Assignee: WebTV Networks, Inc., Mountain View, Calif.

[21] Appl. No.: 09/057,393

[22] Filed: Apr. 8, 1998

[51] Int. Cl.[7] .................................................. G06T 11/20

[52] U.S. Cl. ............................................................ 345/441

[58] Field of Search ..................................... 345/441, 443

[56] References Cited

U.S. PATENT DOCUMENTS

5,684,941  11/1997  Dye ........................................... 395/141
5,864,639   1/1999  Chao ......................................... 382/293

Primary Examiner—Mark K. Zimmerman
Assistant Examiner—Mano Padmanabhan
Attorney, Agent, or Firm—Workman, Nydegger & Seeley

[57] ABSTRACT

A system and method of rendering polygons in graphics system using incremental iterative addition in place of complex division operations. A setup engine provides relevant values to edge and span walk modules for rapid processing and rendering of polygon characteristics including material values. Characteristic functions are iterated with respect to polygon area and along individual spans to derive values for each pixel therein.

20 Claims, 8 Drawing Sheets

POLYGON RENDERING METHOD AND SYSTEM WITH DEDICATED SETUP ENGINE

BACKGROUND OF THE INVENTION

1. Field of the Invention

The present invention relates generally to polygon rendering in graphics systems, and more particularly to a system and method of rendering polygons such as triangles using a setup device for reducing the number of time-consuming mathematical operations.

2. Description of Background Art

Graphics systems for computer-generated display of three-dimensional images typically render such images by breaking down on-screen objects into primitives, and rendering each primitive. Primitives may be defined according to their positions, shapes, and other characteristics in three-dimensional space, and are projected onto a two-dimensional surface represented in a frame buffer fir display on a two-dimensional screen. Rendering is typically accomplished using scan conversion or other conventional technique for determining which pixels lie inside the projected primitive. Texture-mapping may be employed to improve the appearance and apparent realism of the resultant projection. These projection and mapping techniques are disclosed, for example, in Foley, van Dam, et al., *Computer Graphics: Principles and Practice*, 2d ed., Addison-Wesley, 1990, at pp. 67–144 and 741–45.

Primitives often take the form of polygons such as triangles. Accordingly, the overall performance of a graphics system is affected by the speed at which such polygons can be rendered. Conventional systems perform a number of arithmetic operations when rendering each polygon. Given a set of polygon vertex points and material values (such as color, luminosity and the like) for each vertex point, the graphics system determines material values for each pixel in the polygon, as follows.

Preprocessing is performed to determine which pixels lie within the polygon edges defined by the polygon vertices. Material values for pixels within the polygon are then interpolated based on supplied material values for each polygon vertex. Conventionally, such interpolation is performed by determining the slopes of the polygon edges defined by the vertex, and further determining gradients for material values along the polygon edges. See Foley, van Dam, et al. at pp. 735–41 and 668–72. Given the slope of each edge, and the material values of the two vertices corresponding to the edge, interpolated values at the intersection of the edge and any arbitrary scan line can be derived.

Conventional systems determine a slope for each polygon edge, in order to determine the interpolated values to be used in traversing the polygon edges. These values are employed to define starting and ending points of each row in the polygon. Thus, for example, in a system employing triangles as primitives, three slopes are determined for each primitive to be rendered, in order to define the starting and ending points of each row along all three edges of the triangle. Each slope calculation requires a division operation.

One additional division operation is needed, as follows material properties, such as alpha, color, texture, and perspective values, are iterated over a triangle using bilinear interpolation, as defined by a linear equation of the form:

$$q(x,y) = A_q x + B_q y + C_q \quad \text{(Eq. 1)}$$

where q is any material property, and A, B, and C are constants.

If this equation is expanded for all three vertices of a triangle, and the equations are solved for $A_q$, $B_q$, and $C_q$, it becomes clear that the denominator of the fraction of the values of $A_q$ and $B_q$ is equal to twice the area of the triangle. Thus, an additional division operation is required for determination of the inverse of polygon area.

Thus, for systems employing triangles, four division operations are required for each polygon rendering operation. In general, division calculation is a time-consuming operation. Hence, the four division operations required for triangle rendering represent a significant bottleneck in throughput for conventional graphics systems.

In conventional graphics systems, slopes are provided for each of the three edges of a triangle. Using this information, starting and ending points of each span are determined. Material properties are then interpolated along the span in order to develop values for each pixel in the span. Such techniques are described, for example, in Foley, van Dam, et al. at pp. 883–85.

Thus, it can be seen that conventional graphics systems employ techniques that involve a number of time-consuming division operations. Using a geometric processor to calculate slopes and gradients for a polygon can be an expensive solution requiring additional components, while relying on the central processing unit to perform such operations can result in diminished performance.

What is needed is a system for rendering polygons that reduces the number of expensive division operations required for each polygon, so as to improve overall performance without increasing system cost or introducing additional component architecture.

SUMMARY OF THE INVENTION

In accordance with the present invention, there is provided a system and method of rendering polygons in a graphics system using relatively few division operations. Rather than performing a division operation for each edge in a triangle primitive, plus a division to determine the inverse of polygon area, the present invention is able to render triangles with only one division operation for a single edge, plus one division for the inverse of polygon area. Thus, the present invention is capable of rendering a triangle with only two division operations rather than four, thereby reducing processor time.

The present invention reduces division operations by determining values for slope, an inverse of area, and material values if appropriate, in a setup unit prior to rendering a polygon such as a triangle. These values are provided to an edge walker and a span walker. The edge walker iterates along the long edge of the triangle and determines the starting point for each span using incremental addition. Two characteristic functions are iterated and adjusted in order to determine whether any correction is needed in the span starting points.

The span walker then determines values for each successive pixel in each span defined by the edge walker. The span walker uses incremental addition to apply a gradient to the material values in order to provide pixel values without requiring complex calculations. In addition, the span walker uses information from the setup engine to determine the end of each span.

In this manner the present invention is able to render polygons with minimal complexity of calculation.

DETAILED DESCRIPTION OF THE INVENTION

Figure 1:
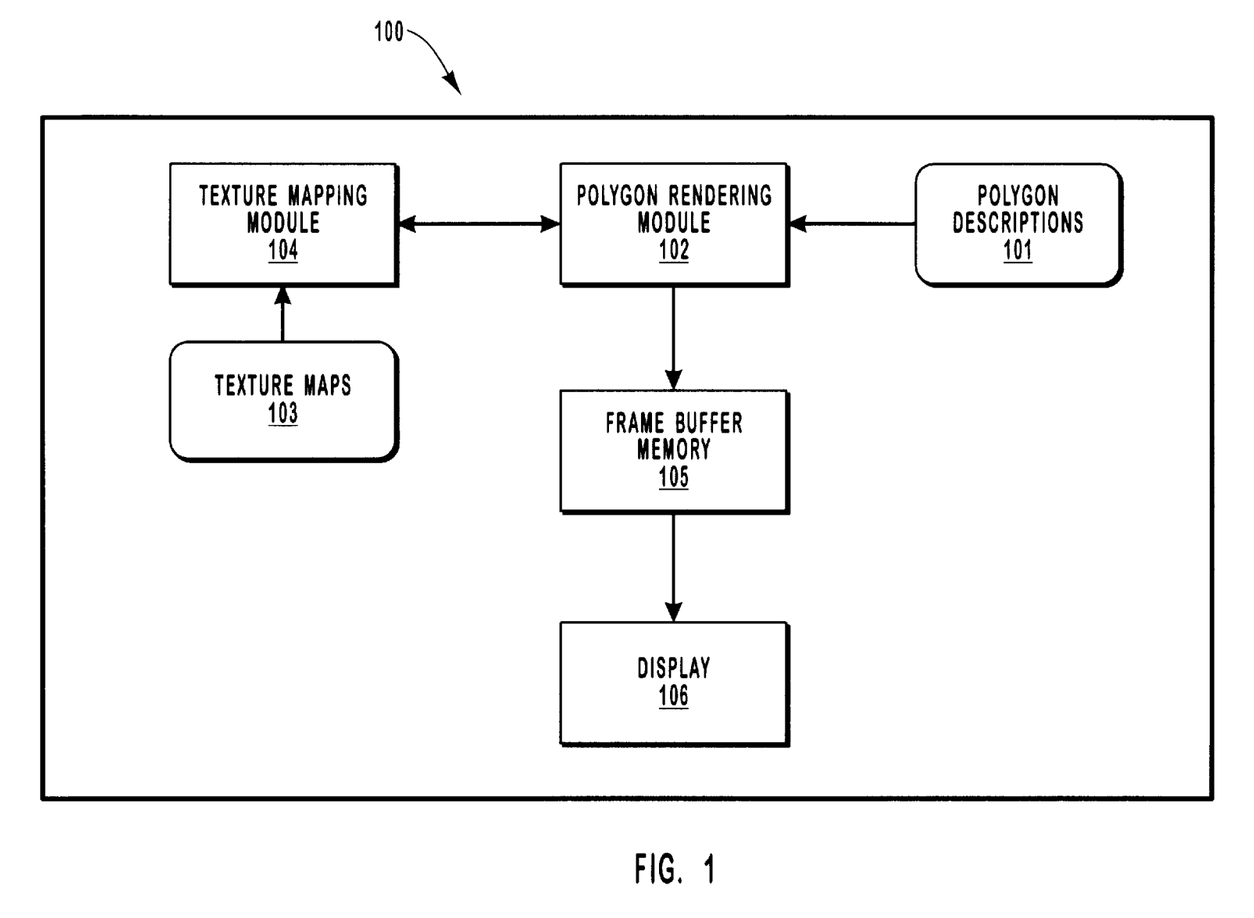
FIG. 1 is a block diagram of a system for practicing the present invention.

Referring now to FIG. 1, there is shown a block diagram of a system 100 for practicing the present invention. System 100 is typically implemented on a graphics device such as Silicon Graphics Workstation, or on a graphics card included in a computer system such as a personal computer having an Intel Pentium™ processor and running the Windows™ 95 operating system from Microsoft Corporation. Polygon rendering module 102 generates pixel values using stored polygon descriptions 101 containing material values at polygon vertices. Module 102 may also implement projection algorithms that are known in the art in order to convert three-dimensional representations into two-dimensional projections for representation in frame buffer memory 105.

Texture mapping module 104 may also be provided to improve the appearance of projected polygons by applying surface features. Module 104 reads texture maps 103 containing texture images and provides projections according to known texture mapping techniques. Module 102 provides module 104 with texture coordinates associated with each pixel to be drawn on the screen. Module 102 also uses output of module 104 in rendering polygons.

Frame buffer memory 105 is conventional memory that may be optimized for storage of image data. Memory 105 typically contains a plurality of memory locations, each representing a pixel in the image to be displayed. Each location of memory 105 contains relevant information describing the appearance of the corresponding pixel, such as a color value. Display 106, which may be a conventional cathode-ray tube or other type of output device, presents the contents of some portion of memory 105 to the user.

The block diagram of FIG. 1 illustrates merely one possible structural scheme for implementing the present invention. Those skilled in the art will recognize that other architectures may be used without departing from the spirit or essential characteristics of the invention. For example, the present invention is capable of operation without a texture mapping module 104 and maps 103 as shown in FIG. 1.

Figure 2:
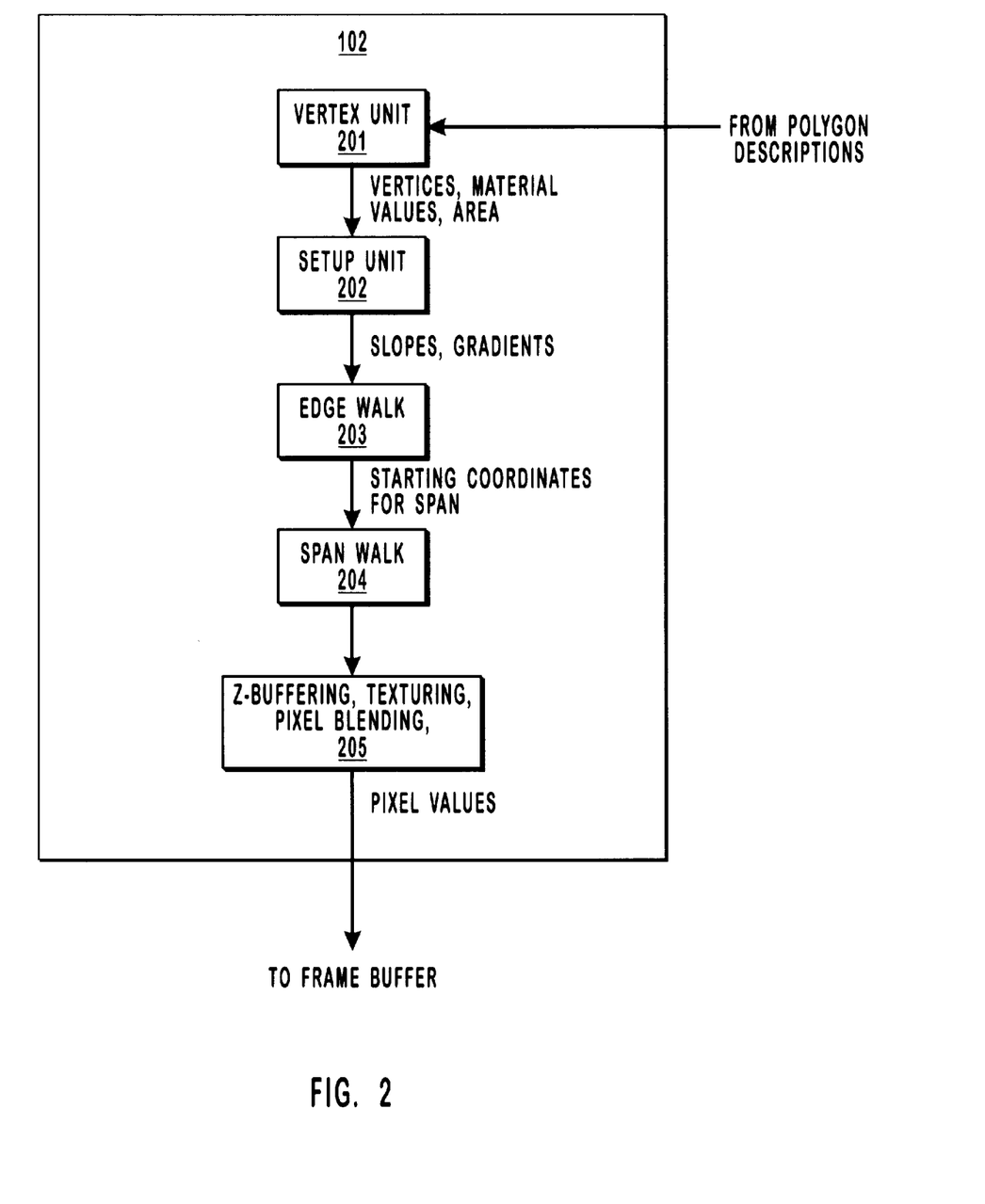
FIG. 2 is a diagram of the overall pipeline of a polygon rendering module according to the present invention.

Referring now to FIG. 2, there is shown a diagram of the overall pipeline of polygon rendering module 102 using the techniques of the present invention. The components shown in FIG. 2 are conceptual functional units, which may be implemented as discrete physical components, or as part of a single overall hardware or software element. For illustrative purposes, the pipeline operation of module 102 is descried in terms of operation on a single triangular primitive. However, the present invention is able to operate on any number of primitives simultaneously, and other primitive shapes may be employed.

Vertex unit 201 autonomously reads data describing material values at each vertex of a polygon. Material values may include, for example, x and y coordinates, color values, texture, luminance, and the like. These values are read from memory in a conventional manner. In one embodiment, vertex unit 201 obtains these values from stored polygon descriptions 101, though some of the values may be derived or calculated by known projection, interpolation, or other methods. Vertex unit 201 then provides coordinate values and other material values for each of the vertices of the triangle being rendered. In one embodiment, vertex unit 201 also provides the value of the area of the triangle, while in another embodiment this value is determined and provided by setup unit 202. The method of area determination is as follows.

Figure 3:
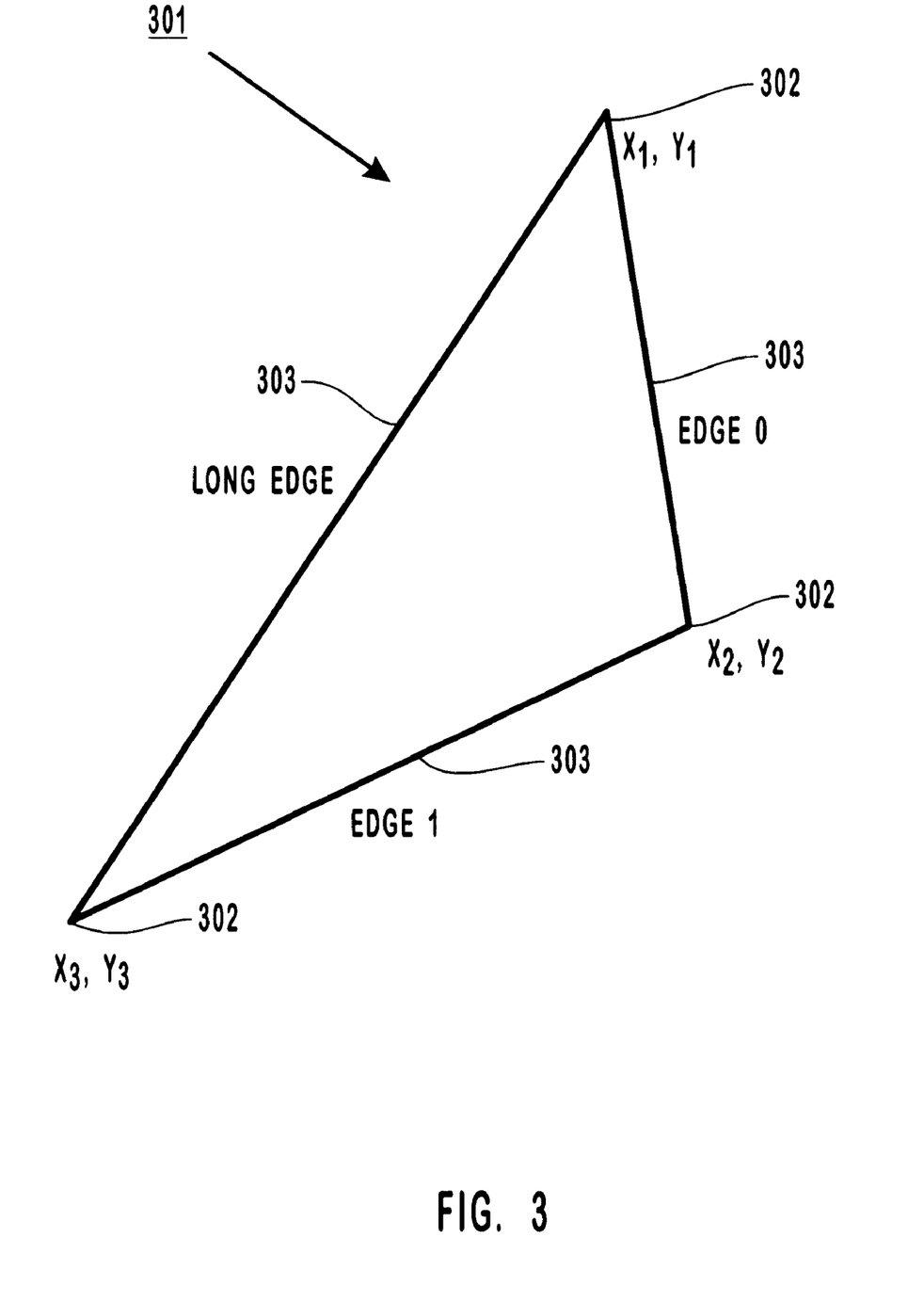
FIG. 3 shows an example of a triangle to be rendered.

Referring also to FIG. 3, there is shown an example of a triangle 301 to be rendered. The vertices 302 of triangle 301 are shown having coordinates $(x_1, y_1)$, $(x_2, y_2)$, and $(x_3, y_3)$. The area A of triangle 301 is given by the equation:

$$A = \tfrac{1}{2}[x_1(y_2-y_3) + x_2(y_3-y_1) + x_3(y_1-y_2)] \tag{Eq. 2}$$

In one embodiment, the factor of ½ is ignored, as the area of a parallelogram comprising the triangle and its mirror image is used.

Referring again to FIG. 2, the output of vertex unit 201, including for example x and y coordinates, color, texture, and the like, are passed to setup unit 202. Setup unit 202 determines gradients for the triangle, to be used in subsequent processing. Edge walk module 203 accepts the output of setup unit 202 and determines a starting pixel for each span of the triangle, where a span is a horizontal row of pixels lying within the bounds of the triangle. Module 203 also determines material values for the starting pixel.

Values determined by edge walk module 203 are passed to span walk module 204. Span walk module 204 also accepts the gradients determined by setup unit 202. Module 204 then walks horizontally along the span, determining values for all pixels in the span. As span walk module 204 passes along each pixel, it determines material values for the pixel and passes such values down the pipeline to other components 205. Other components 205 are conventional graphics processing components, such as modules for z-buffering, texturing, blending, and the like. Such components are fully described in, for example, Foley et al.

The following description provides additional detail regarding the operation of setup unit 202 and the manner in which modules 203 and 204 use the output of setup unit 202 in rendering a triangle.

Figure 4:
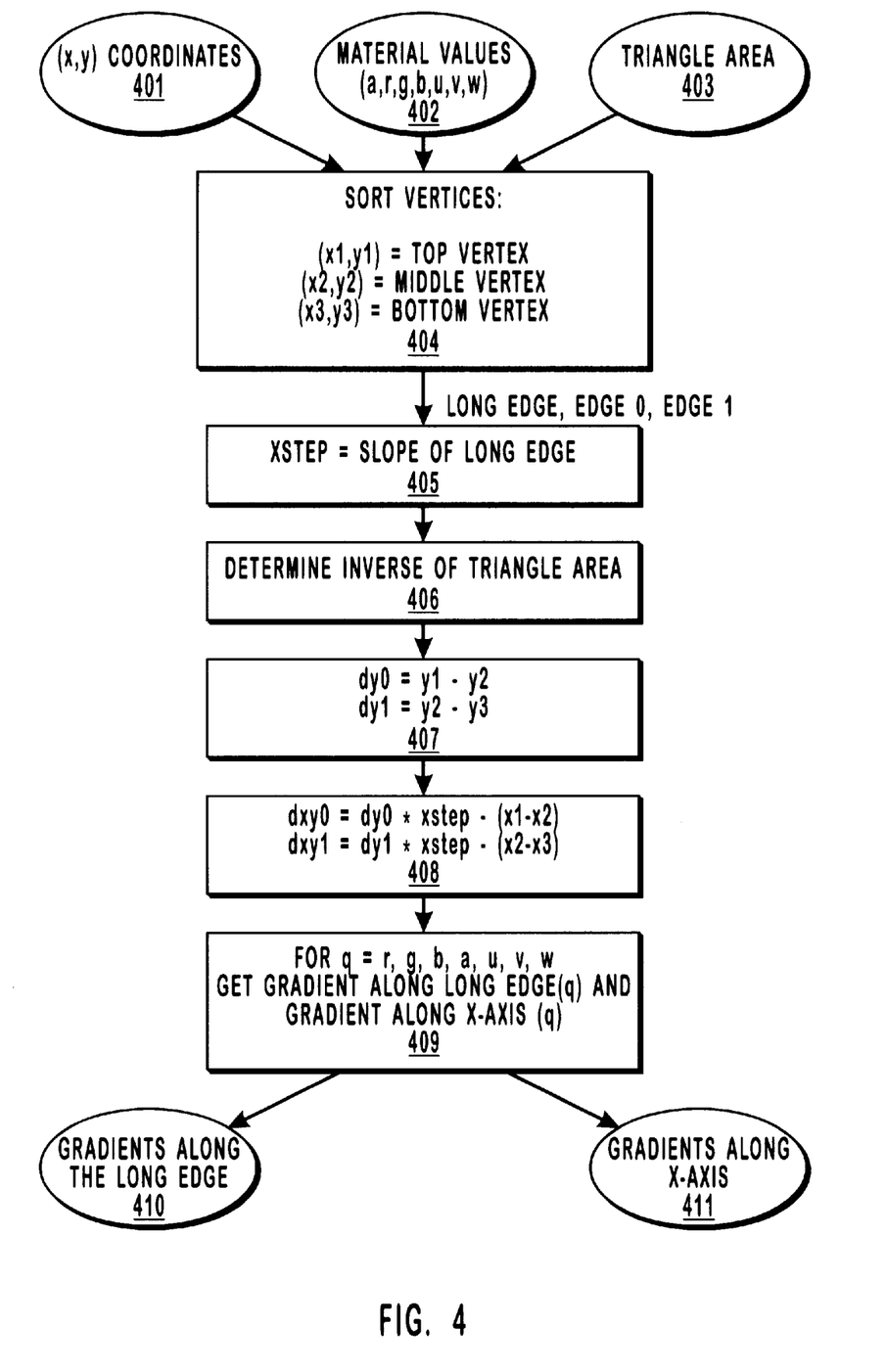
FIG. 4 is a flowchart of a method of operation of a setup unit according to one embodiment of the present invention.

Referring now to FIG. 4, there is shown a flowchart of the method of operation of setup unit 202 according to one embodiment of the present invention. Setup unit 202 takes as its input the two-dimensional coordinates (x,y) 401 of each vertex of the triangle being rendered, as well as material values 402 for these vertices. Material values may include, for example:

a: alpha channel value;

r, g, b: color values (red, green, blue);

u, v: texture map coordinates; and w: perceived distance (used in texture map processing).

Setup unit 202 also takes as input the area of the triangle 403, as generated by vertex unit 202 or by setup unit 202.

Setup unit 202 sorts 404 the vertices according to their y-coordinates, so as to define a top vertex, middle vertex, and bottom vertex. Referring also to FIG. 3, the coordinate designations for these three vertices are shown as (x1, y1), (x2, y2), and (x3, y3) respectively. Based on the sorting operation, three triangle edges 303 are defined. The longest edge, defined as the edge having the greatest difference in y-values of its endpoints, is identified. The remaining two edges are designated as edge 0 and edge 1.

Setup unit 202 determines 405 the slope of the long edge (designated as xstep), as will be described in more detail below. It then determines 406 the inverse of the area 403 of the triangle. In one embodiment, the operations in 405 and 406 each involve a division. As will be seen below, the method of the present invention avoids the necessity of performing additional division operations, thus improving performance by reducing the number of complex arithmetic operations.

Once xstep and the inverse of the area have been determined, setup unit 202 determines 407 the y-difference values dy0, dy1 for edges 0 and 1. dy0 is given by y1–y2, and dy1 is given as y2–y3. Thus, dy0 and dy01 give the y-component of edges 0 and 1.

Setup unit 202 then determines 408 values for dxy0 and dxy1 using the following equations:

$$dxy0 = dy0 * xstep - (x1-x2) \quad \text{(Eq. 3)}$$

$$dxy1 = dy1 * xstep - (x2-x3) \quad \text{(Eq. 4)}$$

As will be seen below, edge walk module 203 uses dxy0 and dxy1 to increment characteristic functions of the triangle, and span walk module 204 uses dy0 and dy1 to increment characteristic functions for spans. Setup unit 202 also determines 409 gradients along the long edge 410 and gradients along the x-axis for a span 411, for all of the material values, as will be described in more detail below. Gradients along the long edge 410 and gradients along the x-axis 411 are provided to edge walk module 203 for further processing.

Figure 5:
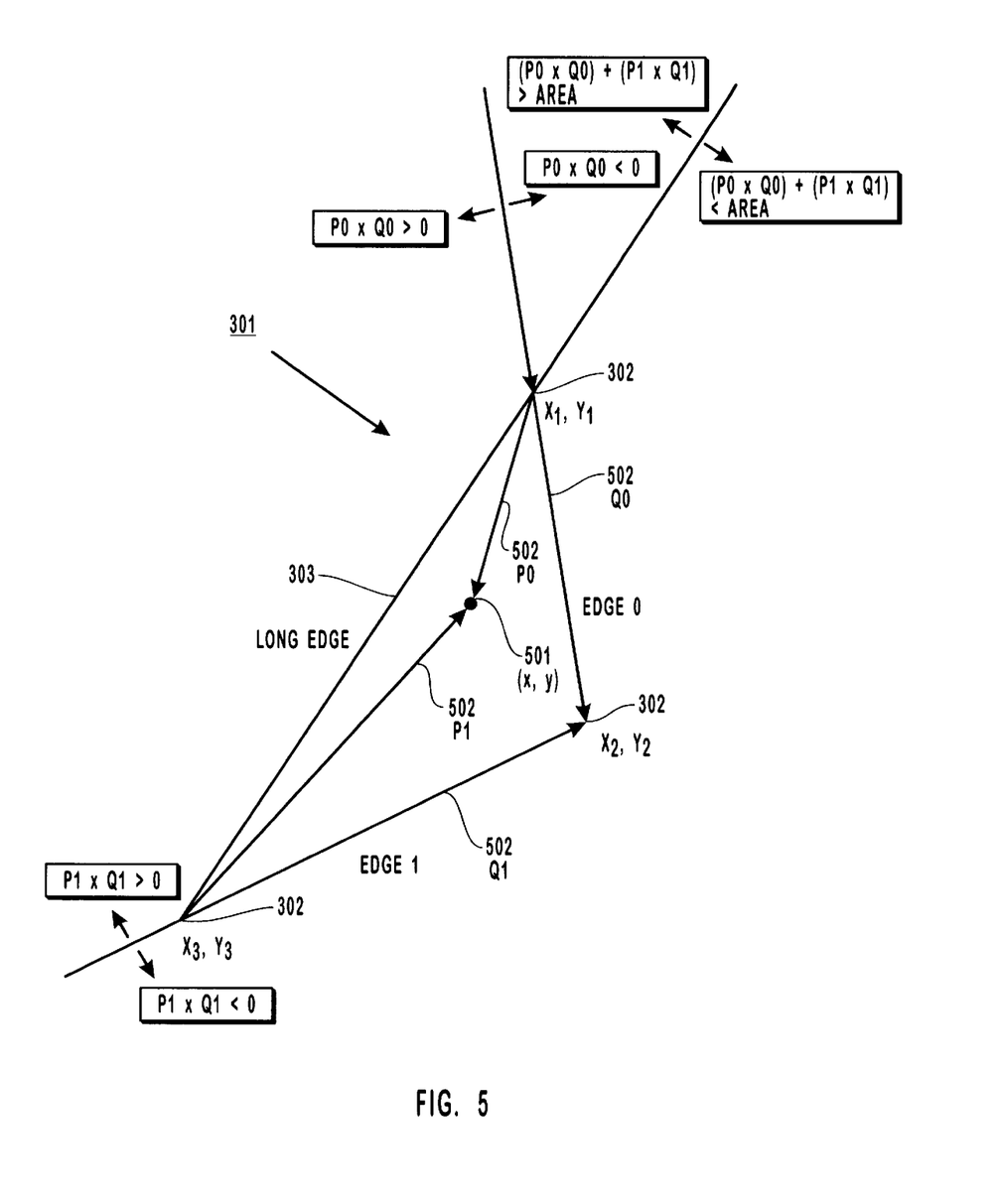
FIG. 5 is an example of a triangle to be rendered, including vectors.

The following description will show how edge walk module 203 and span walk module 204 use the values generated by setup unit 202. Referring now to FIG. 5, there is shown triangle 301 redrawn with a number of vectors for illustrative purposes. A point 501, designated with the coordinates (x,y), is indicated to represent an arbitrary point. Two P vectors 502 are drawn from the endpoints of long edge 303 to point 501: vector P0 is drawn from (x1,y1) to (x,y) and vector P1 is drawn from (x3,y3) to (x,y). In addition, two Q vectors 502 are drawn along edges 0 and 1, so that vector Q0 is drawn from (x1,y1) to (x2,y2) and vector Q1 is drawn from (x3,y3) to (x2,y2).

In rendering triangle 301, the present invention performs edge and span walking so that it can process every pixel in triangle 301. In order to determine whether or not a point 501 lies within triangle 301, cross-products of the above-defined vectors are taken. In order to determine whether point 501 lies within triangle 301 with respect to edge 0, a cross-products of vectors P0 and Q0 can be taken. Similarly, in order to determine whether point 501 lies within triangle 301 with respect to edge 1, a cross-product of vectors P1 and Q1 can be taken. In each case, a positive value for the cross-product indicates that point 501 lies within triangle 301 for that edge.

For edge 0, the cross-product P0×Q0 is determined as follows:

If, in FIG. 5, vertex X1,Y1 is designated by O, then $$\overline{OP} = (x1-x)\bar{i} + (y1-y)\text{fheight}\bar{j} + 0\bar{k}$$

$$\overline{OQ} = (x1-x2)\bar{i} + (y1-y2)\text{fheight}\bar{j} + 0\bar{k}$$

where $\bar{i}, \bar{j}$, and $\bar{k}$ are unit vectors along the x-, y-, and z-axes respectively.

The cross product $\overline{OP} \times \overline{OQ}$ is defined as:

$$\begin{vmatrix} i & j & k \\ x1-x & y1-y & 0 \\ x1-x2 & y1-y2 & 0 \end{vmatrix}$$

The above determinant evaluates to (x–x1)(y1–y2)–(y–y1)(x1–x2).

Thus, $$P0 \times Q0 = (x-x1)(y1-y2) - (y-y1)(x1-x2) \quad \text{(Eq. 5)}$$

$$= x(y1-y2) - y(x1-x2) - [x1(y1-y2) - y1(x1-x2)]$$

$$= Ax - By - C$$

where:
A=y1–y2;
B=x1–x2; and
C=x1(y1–y2)–y1(x1–x2).
A, B, and C are all constants.

The cross product P0×Q0 is equal to the area of the triangle. As will be described below, edge walk module 203 uses this area value as the starting point for its interpolation.

Edge walk module 203 determines the boundaries of each span to be rendered, using the information provided by setup unit 202. In making this determination, edge walk module 203 begins with an initial value for P0×Q0=0 for (x,y)=(x1, y1), which represents the top of the triangle. Edge walk module 203 then iterates the value of P0×Q0 along the long edge of the triangle by incrementing y by 1 and incrementing x by the slope of the long edge, designated as xstep. The new value for P0×Q0 after one increment is given by:

$$(P \times Q)_{new} = A(x + xstep) - B(y+1) - C \quad \text{(Eq. 6)}$$

$$= Ax - By - C + Axstep - B$$

$$= (P \times Q)_{old} + Axstep - B$$

$$= (P \times Q)_{old} + dxy0$$

where
dxy0=Axstep–B;
A and B are as given above in Eq. 5; and
xstep=(x3–x1)/(y3–y1), modified by a ceiling or floor function.

This value xstep represents the slope of the long edge, modified by a ceiling or floor function, as follows. If the long edge of the triangle is on the left side, the triangle is scanned from left to right. Conversely, if the long edge of the triangle is on the right side, the triangle is scanned from right to left.

The value of xstep is rounded to an integer, as follows. If the scan direction is left to right,
xstep=FLOOR(slope)=FLOOR((x3–x1)/(y3–y1)).
If the scan direction is right to left,
xstep=CEIL(slope)=CEIL((x3–x1)/(y3–y1)),
where:
FLOOR(x) rounds down to the next lowest integer, such that FLOOR(x)=INT(x); and
CEIL(x) rounds up to the next highest integer, such that CEIL(x)=INT(x+0.5).

Thus, the value of xstep is an integer approximating the true slope of the long edge. By providing an integer value for xstep, the present invention is able to determine gradients for material values that can be used to determine material values at individual pixel locations. Since pixels are located at positions represented by integers, the above-described technique provides more accurate material values than unmodified (non-integer) xstep values.

The value of dxy0=dy0*xstep−(x1−x2) is determined by setup unit 202, as described above in connection with FIG. 4.

Once the span containing point (x2, y2) is reached, edge 1 becomes the right bound for succeeding spans. For iteration along edge 1, edge walk module 203 uses the value of dxy1=dy1*xstep−(x2−x3) as provided by setup unit 202.

Thus, given the values provided by setup unit 202, edge walk module, by performing simple incremental additions using dxy0 and dxy1, is able to provide information to span walk module 204, as described below, for determining the end of each span.

Span walk module 204 iterates along each span by incrementing the value of x by 1 (for left-to-right traversal) or by decrementing the value of x by 1 (for right-to-left traversal).

For left-to-right traversal, then, for edge 0, the new value for P×Q after one increment is given by:

$$(P \times Q)_{new} = A(x+1) - By - C \quad \text{(Eq. 7)}$$
$$= Ax - By - C + A$$
$$= (P \times Q)_{old} + A$$

where A=dy0=y1−y2. Since A is a negative value, P×Q gets smaller with each increment, and reaches zero by the time module 204 reaches the right edge.

For right-to-left traversal, the new value for P×Q after one decrement is given by:

$$(P \times Q)_{new} = A(x-1) - By - C \quad \text{(Eq. 7A)}$$
$$= Ax - By - C - A$$
$$= (P \times Q)_{old} - A$$

where A=dy0=y1−y2. Since a is a negative value, P×Q gets larger with each decrement, and the sing changes by the time module 204 reaches the left edge.

For edge 1, the new value for P×Q after one increment or decrement is obtained in similar manner to Eqs. 7 and 7A, with A=dy1=y2−y3.

Thus, given the values provided by setup unit 202, span walk module 204 is able to iterate along each span by performing simple incremental additions. The operation of module 204 will be described in more detail below in connection with FIG. 7.

Figure 6:
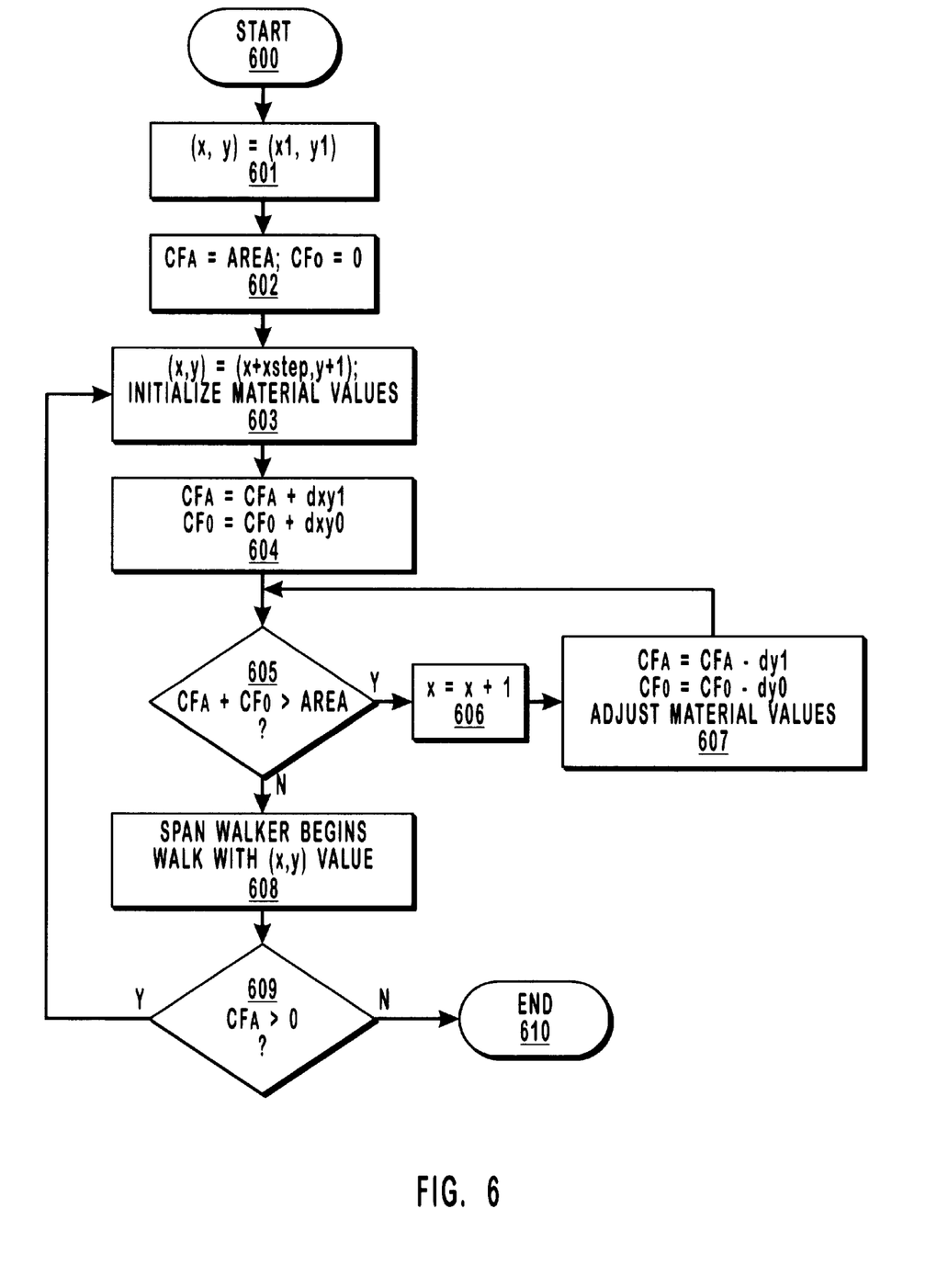
FIG. 6 is a flowchart showing operation of an edge walk module according to one embodiment of the present invention.

Referring now to FIG. 6, there is shown a flowchart of the operation of edge walk module 203. Coordinates (x,y) are initialized 601 to the coordinates of the top vertex of triangle 301, represented by (x1, y1). Two characteristic functions are initialized 602, namely $CF_A$, which is set to the area of triangle 301, and $CF_0$, which is set to zero. As will be seen below, the sum of these two values approximates the area of triangle 301 at all time during the edge walk. When the sum exceeds the area, the starting pixel of the span (the value of x) has stepped outside the triangle and is therefore adjusted to bring it back inside the triangle. The mechanics of this process is described below.

Figure 8:
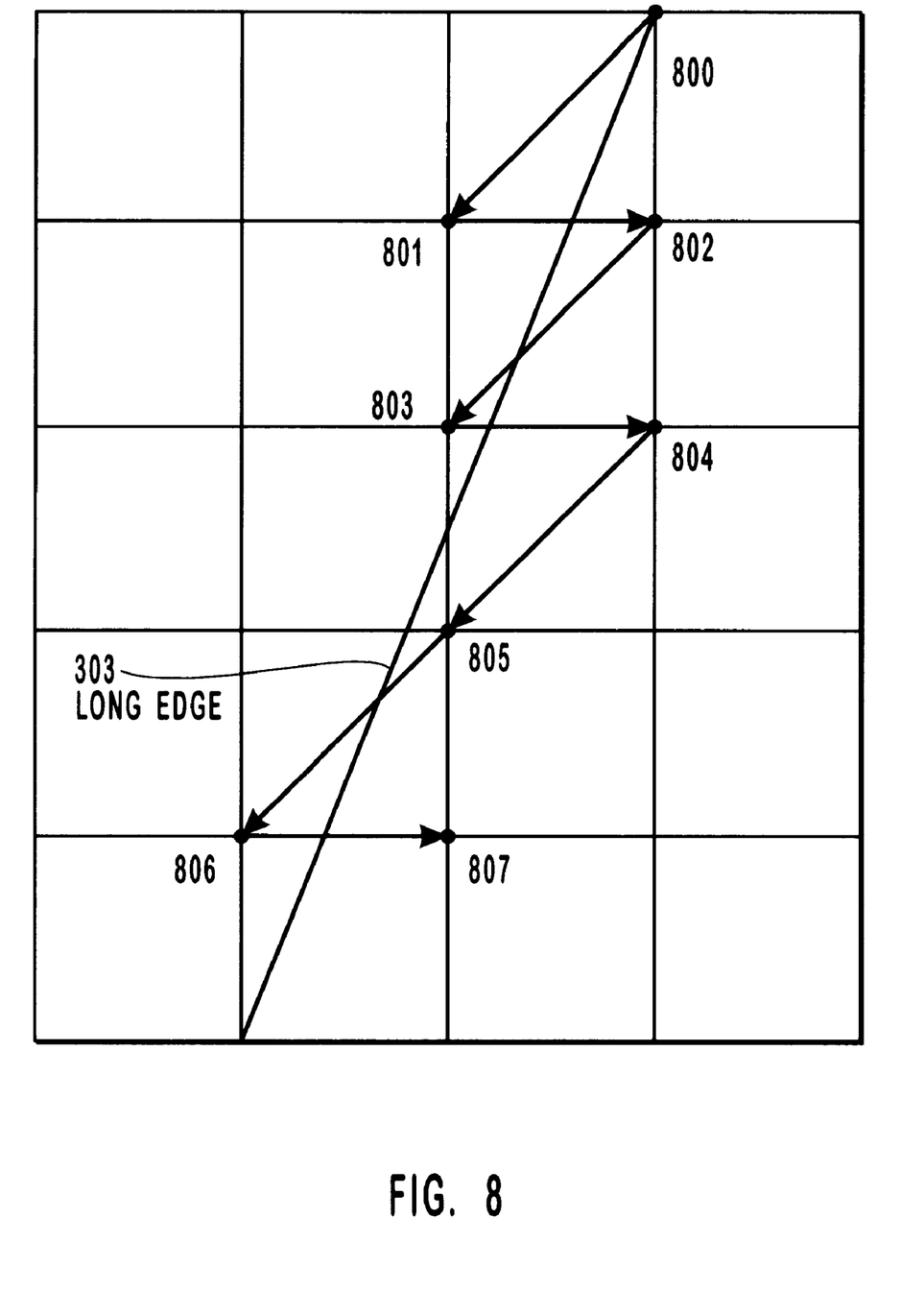
FIG. 8 is an example of an iterative walking process according to the present invention.

Referring also to FIG. 8, there is shown a simplified example of the iterative walking process performed by edge walk module 203. Point 800 represents the starting point at the top vertex, where (x,y) and $CF_A$ and $CF_0$ have been initialized.

Edge walk module 203 walks down the long edge by incrementing 603 coordinates (x,y). This is done by adding CEIL or FLOOR (as appropriate, see above) of xstep (the slope of the long edge) to the value of x and adding 1 to the value of y. In step 603, module 203 also initializes material values at the start pixel. Point 801 in FIG. 8 represents an example of a point determined in step 603. Module 203 increments 604 the values of $CF_A$ and $CF_0$ by adding dxy1 and dxy0, respectively.

Next, module 203 determines 605 whether it has stepped outside triangle 301 by testing whether the value of $CF_A$+$CF_0$ is greater than the area of the triangle. If this is the case, x is incremented 606 by 1, and $CF_A$ and $CF_0$ are decreased 607 by dy1 and dy0 respectively. Point 802 in FIG. 8 shows an example of this adjustment; since point 801 lies outside (i.e., to the left of) the triangle, x has been incremented to bring point 802 into the triangle. When such an adjustment is performed to bring the point back into the triangle, module 203 makes corresponding adjustments to the initialized material values by adding the gradient along the x-axis.

Edge walk module 203 then passes the coordinates (x,y) to span walk module 204, which begins 608 its span walk as described in more detail below. Referring again to FIG. 8, points 803 and 806 indicate further examples of points lying outside the triangle which are adjusted to 804 and 807 respectively by incrementing x in step 606. Point 805 indicates an example of a point which lies within the triangle and therefore does not require adjusting.

Referring again to FIG. 6, once the relevant values have been passed to span walk module 204 for processing, edge walk module 203 tests 609 whether $CF_A$ is greater than zero. As long as $CF_A$ is greater than zero, there is more of the triangle to be processed, and module 203 returns to 603 to proceed to the next span. If $CF_A$ is not greater than zero, the triangle has been completely traversed and module 203 ends 610.

In an alternative embodiment, the end of the triangle is detected when y>=y3.

Figure 7:
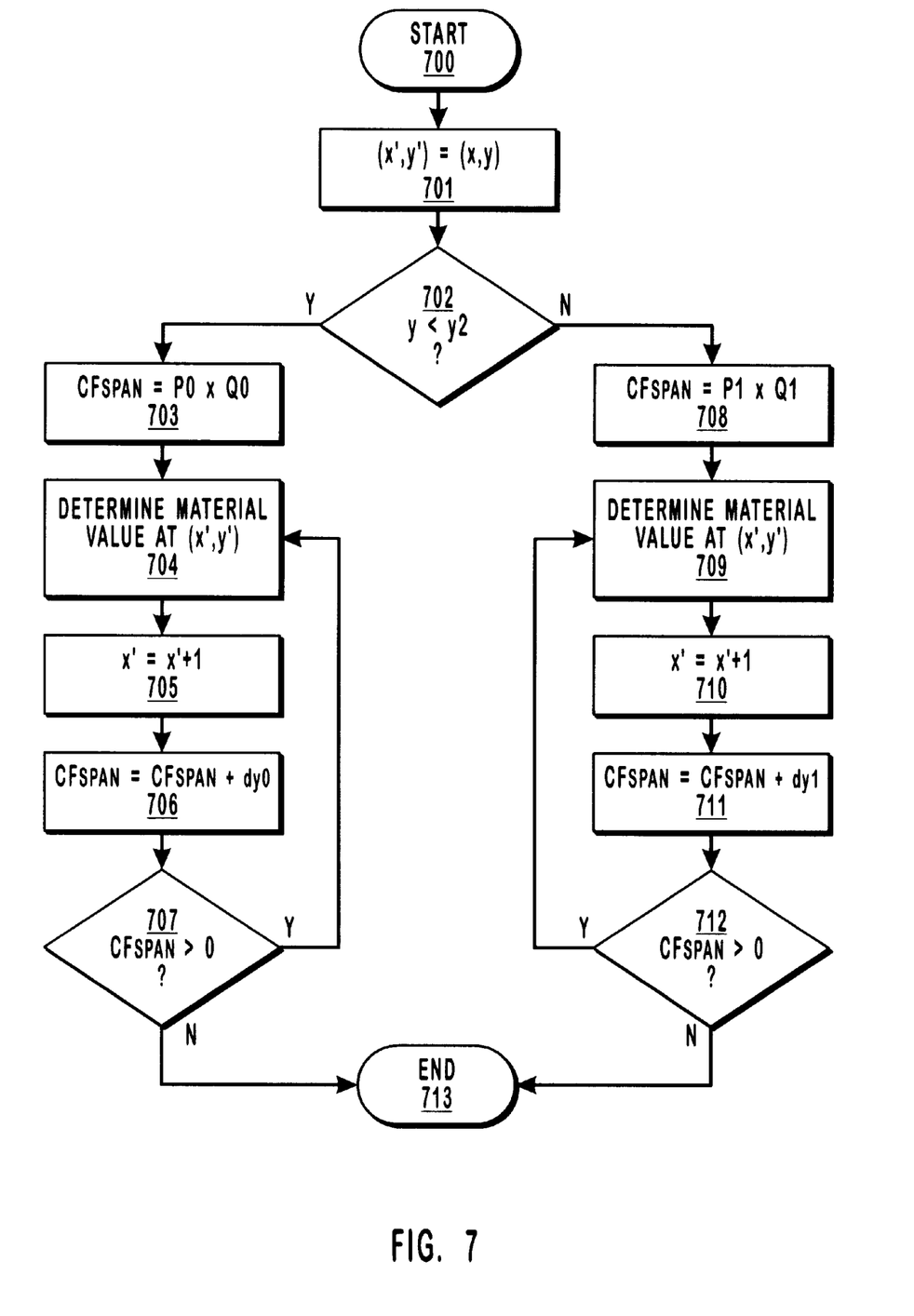
FIG. 7 is a flowchart showing operation of a span walk module according to one embodiment of the present invention.

Each span defined by the method of FIG. 6 is traversed by span walk module 204. Referring now to FIG. 7, there is shown a flowchart of the method of module 204 according to one embodiment of the present invention. Coordinates (x',y') are initialized 701 to (x,y), which represents the first pixel of the current span on or closest to the long edge of the triangle. Module 204 then determines 702 whether y is greater than or less than y2, thus indicating whether edge 0 or edge 1 will be used as the endpoint delimiter. If y<=y2, edge 0 will be used and steps 703 through 707 are performed.

A characteristic function $CF_{SPAN}$ is defined 703 by the cross-product P0×Q0, The material values (r,g,b,u,v, and others as needed) are determined 704 at the coordinates (x',y'). Each material value is determined as will be described below. x' is then incremented 705 by 1, and the characteristic function $CF_{SPAN}$ is updated 706 by adding dy0 as follows:

$$CF_{SPANold} = (P \times Q)_{old} \qquad = Ax' - By' - C$$
$$CF_{SPANnew} = (P \times Q)_{new} \qquad = A(x'+1) - By' - C$$
$$\qquad = Ax' - By' - C + A$$
$$\qquad = CF_{SPANold} + A$$

where A=dy0=y1−y2.

Module 204 then tests 707 where the value of $CF_{SPAN}$ is greater than zero, and if so, returns to 704. Thus, $CF_{SPAN}$ is successively iterated by adding dy0 until the value of $CF_{SPAN}$ is reduced to zero.

If in 702 it is found that y is not less than y2, module 204 performs similar steps with reference to edge 1 rather than edge 0. $CF_{SPAN}$ is initially defined 708 by the cross-product P1×Q1, and material values are determined 709 at (x',y'). Module 204 then increments 710 x' by 1 and updates 711 $CF_{SPAN}$ by adding dy1=y2−y3. Module 204 then tests 712 where the value of $CF_{SPAN}$ is greater than zero, and if so, returns to 709. Thus, $CF_{SPAN}$ is successively iterated by adding dy1 until the value of $CF_{SPAN}$ is reduced to zero. Once $CF_{SPAN}$ reaches zero, module 204 ends 713.

In the method of FIG. 7, material values are determined in 704 and 709 for each pixel in the span by incremental addition without necessarily performing any complex calculation. Gradients for this increment are provided in advance by setup unit 202 as follows.

For any material value a, assume that a1, a2, and a3 are the predefined values at (x1,y1), (x2,y2) and (x3,y3) respectively. Each of these values can be written as a linear function of the corresponding coordinates, so that $$a1 = lx1 + my1 + n \quad \text{(Eq. 8)}$$

$$a2 = lx2 + my2 + n \quad \text{(Eq. 9)}$$

$$a3 = lx3 + my3 + n \quad \text{(Eq. 10)}$$

where l, m, and n are functions of a.

Expressed in terms of matrices, we have:

$$\begin{bmatrix} a1 \\ a2 \\ a3 \end{bmatrix} = \begin{bmatrix} x1 & y1 & 1 \\ x2 & y2 & 1 \\ x3 & y3 & 1 \end{bmatrix} [l \ m \ n] \quad \text{(Eq. 11)}$$

which becomes:

$$[l \ m \ n] = \begin{bmatrix} x1 & y1 & 1 \\ x2 & y2 & 1 \\ x3 & y3 & 1 \end{bmatrix}^{-1} \begin{bmatrix} a1 \\ a2 \\ a3 \end{bmatrix} \quad \text{(Eq. 12)}$$

Since the inverse of a matrix A is $1/Det(A)*(co\text{-}factor\ matrix)^T$, Eq. 12 can be written as:

$$[l \ m \ n] = \frac{1}{det} \begin{bmatrix} y2-y3 & -(x2-x3) & x2y3-x3y2 \\ -(y1-y3) & x1-x3 & -(x1y3-x3y1) \\ y1-y2 & -(x1-x2) & x1yx-x2y1 \end{bmatrix}^T \begin{bmatrix} a1 \\ a2 \\ a3 \end{bmatrix} \quad \text{(Eq. 13)}$$

where:

$$det = x1(y2-y3) - y1(x2-x3) + (x2y3-x3y2)$$

$$= \text{area of the triangle}$$

Eq. 13 expands to:

$$l = (a1(y2-y3) - a2(y1-y3) + a3(y1-y2))/\text{Area} \quad \text{(Eq. 14)}$$

$$m = (-a1(x2-x3) + a2(x1-x3) - a3(x1-x2))/\text{Area} \quad \text{(Eq. 15)}$$

which can also be written as:

$$l = ((a2-a3)(y3-y1) - (a3-a1)(y2-y3))/\text{Area} \quad \text{(Eq. 16)}$$

$$m = -((a2-a3)(x3-x1) - (a3-a1)(x2-x3))/\text{Area} \quad \text{(Eq. 17)}$$

Once these values are determined, no additional division is needed. Since the inverse of the area was determined by the setup unit 202, Eqs. 16 and 17 can be calculated by multiplication rather than division.

The gradient along the long edge of a is given by:

$$\text{gradient}(a) = (\text{xstep}*l - m) \quad \text{(Eq. 18)}$$

Since this value is constant, it can be predetermined by setup unit 202 and provided to edge walk module 203 to perform iteration in determining a starting value of a for each span.

The gradient of a with respect to x (gradient along the span) is given by l, so that:

$$d/dx(a) = ((a2-a3)(y3-y1) - (a3-a1)(y2-y3))/\text{Area} \quad \text{(Eq. 19)}$$

Essentially, this value is the partial derivative of the material value with respect to x. Since this value is constant for a given triangle, it can be predetermined by setup unit 202 and provided to span walk module 204 to perform iteration for every pixel along a span.

For triangles in which the long edge is on the right side, a similar technique is employed, though the traversal is right-to-left, so that the signs are reversed when describing span walk module 204 operation.

Pseudo-Code Implementation of One Embodiment

In facilitating the above-described functionality, in one embodiment setup unit 202 performs the following operations and determines the following values:

determine inverse of triangle area;

determine x and y deltas (differences) for triangle vertices;

sort vertices based on deltas, to determine top, middle, and bottom vertices;

determine xstep, the geometric slope along the long edge;

determine dxy0, dxy1, dy0, and dy1; and determine gradients along the long edge and gradients along the x-axis for all of the material values, such as r, g, b, a, u, v, and w.

The following pseudo-code examples represent examples of implementations of these operations in one embodiment of the present invention.

Inverse of Triangle Area

In one embodiment, setup unit 202 implements the following pseudo-code to determine the inverse of triangle area:

area=P0×Q0;
iArea=1.0/area;

X and Y Deltas

In one embodiment, setup unit 202 implements the following pseudo-code to determine x and y deltas:

x12=x1−x2;
x23=x2−x3;
x31=x3−x1;

y12=y1−y2;
y23=y2−y3;
y31=y3−y1;
Sort Vertices

In one embodiment, setup unit 202 implements the following pseudo-code to sort and designate triangle vertices:

sort vertices according to y-values;
Vtop=vertex with lowest y-value;
Vmiddle=vertex with middle y-value;
Vbottom=vertex with highest y-value;
designate (x1,y1) as coordinates for Vtop;
designate (x2,y2) as coordinates for Vmiddle;
designate (x3,y3) as coordinates for Vbottom;

Geometric Slope

In one embodiment, setup unit 202 implements the following pseudo-code to determine geometric slope:

```
define FLOOR(x) as INT(x);
define CEIL(x) as INT(x + 0.5)
// determine scan direction according to sign of area
if (area > 0)
    scan_dir = LEFT_TO_RIGHT;
else
    scan_dir = RIGHT_TO_LEFT;
if (scan_dir == LEFT_TO_RIGHT)
    xstep = FLOOR((x3 − x1) / (y3 − y1)) = FLOOR(x31 / y31);
else
    xstep = CEIL((x3 − x1) / (y3 − y1)) = CEIL(x31 / y31);
```

Characteristic Function Interpolation

In one embodiment, setup unit 202 implements the following pseudo-code to determine characteristic function interpolation:

dxy0=(y12)*(xstep)−x12;
dxy1=(y23)*(xstep)−x23;
dy0=y12;
dy1=y23;

Gradients Along Long Edge and Scan Line

In one embodiment, setup unit 202 implements the following pseudo-code to determine gradients along the long edge and along scan lines, for each material value:

for Q in ⟨a, r, g, b, uW, vW, w⟩
    detQx = Q23 * y31 − Q31 * y23;
    detQy = Q23 * x31 − Q31 * y23;
    gradient along x axis = dDx_q = detQx * iArea;
    gradient along long edge = slope_q =
    (detQx * xstep − detQy) * iArea;

From the above description, ti will be apparent that the invention disclosed herein provides a novel and advantageous system and method of rendering polygons using a setup device for reducing the number of time-consuming mathematical operations. The foregoing discussion discloses and describes merely exemplary methods and embodiments of the present invention. As will be understood by those familiar with the art, the invention may be embodied in other specific forms without departing from the spirit or essential characteristics thereof. For example, other polygon shapes may be used. Accordingly, the disclosure of the present invention and example figures are intended to be illustrative, but not limiting, of the scope of the invention, which is set forth in the following claims.

What is claimed is:

1. In a graphics system, a method of rendering a polygon having a plurality of edges and plurality of vertices, each edge being defined by two vertices, and wherein the method is performed in a manner that eliminates having to do a separate division for calculating a slope for each edge, comprising the steps for:

a) selecting a polygon edge; and prior to rendering the polygon, performing steps for;
   b) initializing a set of coordinates at a selected one of the two vertices defining the selected edge;
   c) defining a plurality of starting points for successive spans along the selected edge, each span comprising at least one pixel, by iteratively incrementing the set of coordinates; and
   d) for each successive span, rendering each pixel in the span by iteratively incrementing the set of coordinates along the span, and thereafter, rendering the polygon by performing only two divisions, one for a single edge of the polygon and one for the inverse area of the polygon.

2. The method of claim 1, wherein the polygon has an area, further comprising:

b.1) initializing a first characteristic function value as equal to the polygon area;
   b.2) initializing a second characteristic function value as equal to zero;

and wherein c) comprises:

c.1) incrementing each coordinate in the set of coordinates;
   c.2) incrementing each of the first and second characteristic function values;
   c.3) responsive to the sum of the first and second characteristic functions being greater than the polygon area:
      c.3.1) adjusting a first coordinate in the set of coordinates; and
      c.3.2) adjusting each of the first and second characteristic function values;
   c.4) defining a span starting point as the set of coordinates; and
   c.5) responsive to the first characteristic function value being greater than zero, repeating c.1) through c.5).

3. The method of claim 2, wherein the coordinates comprise an x-coordinate and a y-coordinate, the method further comprising:

a.1) determining a slope of the selected edge;
   a.2) determining a first y-difference value and a second y-difference value; and
   a.3) determining a first characteristic function increment and a second characteristic function increment;

and wherein:

c.1) comprises adding the slope to the x-coordinate and adding 1 to the y-coordinate;
   c.2) comprises adding the first characteristic function increment to the first characteristic function value and adding the second characteristic function increment to the second characteristic function value;
   c.3.1) comprises adding 1 to the x-coordinate; and
   c.3.2) comprises subtracting the first y-difference value from the first characteristic function value and subtracting the second y difference value from the second characteristic function value.

4. The method of claim 3, wherein the polygon is a triangle having vertices (x1,y1), (x2,y2), and (x3,y3):

a.1) comprises determining the slope as xstep=(x3−x1)/(y3−y1);

a.2) comprises determining the first y-difference value as dy1=y2−y3 and the second y-difference value as dy0=y1−y2; and a.3) comprises determining the first characteristic function increment as dxy1=dy1*xstep−(x2−x3) and determining the second characteristic function increment as dxy0=dy0*xtep−(x1−x2).

5. The method of claim 4, further comprising the step of a.1.1) adjusting the determined slope to equal an integer value.

6. The method of claim 1, wherein d) comprises:

d.1) initializing pixel coordinates as equal to the span starting point;

d.2) initializing a span characteristic function value;

d.3) rendering a pixel located at the pixel coordinates;

d.4) incrementing the pixel coordinates;

d.5) incrementing the span characteristic function value; and d.6) responsive to the span characteristic function value being greater than zero, repeating d.3) through d.6).

7. The method of claim 6, wherein the coordinates comprise an x-coordinate and a y-coordinate, and wherein the span starting point has a position, the method further comprising:

a.1) determining a first y-difference value and a second y-difference value;

and wherein:

d.2) comprises:

d.2.1) selecting a vertex of the polygon;

d.2.2) defining a first vector representing the position of the span starting point with respect to the selected vertex;

d.2.3) defining a second vector representing a polygon edge adjacent to the selected vertex; and d.2.4) initializing the span characteristic function value as equal to a cross-product between the first and second vectors;

d.4) comprises adding 1 to the x-coordinate; and d.5) comprises adding one of the first and second y-difference values to the span characteristic function value.

8. The method of claim 1, wherein:

a) further comprises determining at least one material value at each vertex of the polygon;

c) further comprises for each successive span, determining at least one material value for the span starting point by iteratively incrementing the determined material value at the selected vertex; and d) further comprises for each successive span, determining at least one material value for each pixel in the span by iteratively incrementing the material value for the span starting point.

9. The method of claim 8, wherein the at least one material value represents color.

10. The method of claim 8, wherein:

a) further comprises determining a first material value gradient along the selected edge for each material value, and determining a second material value gradient along a span for each material value;

b) comprises iteratively incrementing the material value by adding the first material value gradient; and c) comprises iteratively incrementing the material value by adding the second material value gradient.

11. A computer program product for implementing in a graphics system, a computerized method of rendering a polygon having a plurality of edges and a plurality of vertices, each edge being defined by two vertices, and wherein the method is performed in a manner that eliminates having to do a separate division for calculating a slope for each edge, the computer program product comprising a computer readable medium for carrying computer readable instructions for implementing the method, and wherein the computer readable instructions are comprised of computer program code means for performing the steps of:

a) selecting a polygon edge; and prior to rendering the polygon, performing steps for;

b) initializing a set of coordinates at a selected one of the two vertices defining the selected edge;

c) defining a plurality of starting points for successive spans along the selected edge, each span comprising at least one pixel, by iteratively incrementing the set of coordinates; and d) for each successive span, rendering each pixel in the span by iteratively incrementing the set of coordinates along the span, and thereafter, rendering the polygon by performing only two divisions, one for a single edge of the polygon and one for the inverse area of the polygon.

12. The computer program product of claim 11, wherein the polygon has an area, and wherein the implemented method further comprises:

b.1) initializing a first characteristic function value as equal to the polygon area;

b.2) initializing a second characteristic function value as equal to zero;

and wherein c) comprises:

c.1) incrementing each coordinate in the set of coordinates;

c.2) incrementing each of the first and second characteristic function values;

c.3) responsive to the sum of the first and second characteristic functions being greater than the polygon area:

c.3.1) adjusting a first coordinate in the set of coordinates; and c.3.2) adjusting each of the first and second characteristic function values;

c.4) defining a span starting point as the set of coordinates; and c.5) responsive to the first characteristic function value being greater than zero, repeating c.1) through c.5).

13. The computer program product of claim 12, wherein the coordinates comprise an x-coordinate and a y-coordinate, and wherein the method further comprises:

a.1) determining a slope of the selected edge;

a.2) determining a first y-difference value and a second y-difference value; and a.3) determining a first characteristic function increment and a second characteristic function increment;

and wherein:

c.1) comprises adding the slope to the x-coordinate and adding 1 to the y-coordinate;

c.2) comprises adding the first characteristic function increment to the first characteristic function value and adding the second characteristic function increment to the second characteristic function value;

c.3.1) comprises adding 1 to the x-coordinate; and c.3.2) comprises subtracting the first y-difference value from the first characteristic function value and subtracting the second y difference value from the second characteristic function value.

14. The computer program product of claim 13, wherein the polygon is a triangle having vertices (x1, y1), (x2,y2), and (x3,y3) and wherein step a) comprises:

a.1) determining the slope as xstep=(x3–x1)/(y3–y1);

a.2) determining the first y-difference value as dy1=y2–y3 and the second y-difference value as dy0, y1–y2; and a.3) determining the first characteristic function increment as dxy1=dy1*xstep–(x2–x3) and determining the second characteristic function increment as dxy0=dy0*xstep–(x1–x2).

15. The computer program product of claim 14, wherein the implemented method further comprises the step of a.1.1) adjusting the determined slope to equal an integer value.

16. The computer program product of claim 11, wherein step d) of the implemented method comprises:

d.1) initializing pixel coordinates as equal to the span starting point;

d.2) initializing a span characteristic function value;

d.3) rendering a pixel located at the pixel coordinates;

d.4) incrementing the pixel coordinates;

d.5) incrementing the span characteristic function value; and d.6) responsive to the span characteristic function value being greater than zero, repeating d.3) through d.6).

17. The computer program product of claim 16, wherein the coordinate comprise an x-coordinate and a y-coordinate, and wherein the span starting point has a position, the implemented method further comprising:

for step a):

a.1) determining a first y-difference value and a second y-difference value;

and for step d.2):

d.2.1) selecting a vertex of the polygon;

d.2.2) defining a first vector representing the position of the span starting point with respect to the selected vertex;

d.2.3) defining a second vector representing a polygon edge adjacent to the selected vertex; and d.2.4) initializing the span characteristic function value as equal to a cross-product between the first and second vectors;

d.4) comprises adding 1 to the x-coordinate; and d.5) comprises adding one of the first and second y-difference values to the span characteristic function value.

18. The computer program product of claim 11, wherein:

step a) further comprises determining at least one material value at each vertex of the polygon;

step c) further comprises for each successive span, determining at least one material value for the span starting point by iteratively incrementing the determined material value at the selected vertex; and step d) further comprises for each successive span, determining at least one material value for each pixel in the span by iteratively incrementing the material value for the span starting point.

19. The computer program product of claim 18, wherein the at least one material value represents color.

20. The computer program product of claim 18, wherein:

step a) further comprises determining a first material value gradient along the selected edge for each material value, and determining a second material value gradient along a span for each material value;

step b) comprises iteratively incrementing the material value by adding the first material value gradient; and step c) comprises iteratively incrementing the material value by adding the second material value gradient.

* * * * *

UNITED STATES PATENT AND TRADEMARK OFFICE
CERTIFICATE OF CORRECTION

PATENT NO. : 6,094,201
DATED : July 25, 2000
INVENTOR(S) : Adam Malamy; Nicholas R. Baker; Robert Laker; Padma Parthasarathy; Adrian Sfarti It is certified that error appears in the above-identified patent and that said Letters Patent is hereby corrected as shown below:

Column 1,
Line 18, "buffer" change "fir" to -- for --
Lines 59-60, after "as" change "follow material" to -- follows. Material --

Column 3,
Line 64, before "in terms" change "descried" to -- described --

Column 4,
Line 63, after " vertex unit" change "202" to -- 201 --

Column 5,
Line 55, after "cross-" change "products" to -- product --
Line 66, delete [fheight]
Line 67, delete [fheight]

Column 7,
Line 43, after "Since" change "a" to -- A --
Line 44, after "and the" change "sing" to -- sign --
Line 61, after "at all" change "time" to -- times --

Column 11,
Line 57, after "description" change "ti" to -- it --

Signed and Sealed this

Sixteenth Day of October, 2001

Attest:

NICHOLAS P. GODICI
Attesting Officer  Acting Director of the United States Patent and Trademark Office